US008483237B2

(12) United States Patent
Zimmermann et al.

(10) Patent No.: US 8,483,237 B2
(45) Date of Patent: Jul. 9, 2013

(54) COMMUNICATION MODULE AND METHOD FOR CONNECTING AN ELECTRICAL DEVICE TO A NETWORK

(75) Inventors: Achim Zimmermann, Dietzenbach (DE); Pascal Hampikian, Paris (FR); Gernot Miksch, Altenstadt (DE)

(73) Assignee: Schneider Electric Automation GmbH, Seligenstadt (DE)

( * ) Notice: Subject to any disclaimer, the term of this patent is extended or adjusted under 35 U.S.C. 154(b) by 260 days.

(21) Appl. No.: 12/994,238

(22) PCT Filed: May 28, 2009

(86) PCT No.: PCT/EP2009/056562
§ 371 (c)(1),
(2), (4) Date: Jan. 20, 2011

(87) PCT Pub. No.: WO2009/144284
PCT Pub. Date: Dec. 3, 2009

(65) Prior Publication Data
US 2011/0149994 A1 Jun. 23, 2011

(30) Foreign Application Priority Data

May 28, 2008 (DE) .......................... 10 2008 002 861

(51) Int. Cl.
*H04L 12/66* (2006.01)

(52) U.S. Cl.
USPC ....................................................... 370/463

(58) Field of Classification Search
USPC .................. 370/462–465, 489; 710/305, 306, 710/313–315
See application file for complete search history.

(56) References Cited

U.S. PATENT DOCUMENTS

| 6,151,640 | A * | 11/2000 | Buda et al. ...................... 710/11 |
| 6,334,160 | B1 * | 12/2001 | Emmert et al. .................. 710/11 |
| 6,654,845 | B1 | 11/2003 | Morris et al. |
| 6,701,406 | B1 | 3/2004 | Chang et al. |
| 2003/0005192 | A1 * | 1/2003 | Swope et al. .................. 710/104 |
| 2008/0168196 | A1 | 7/2008 | Hassbjer et al. |

FOREIGN PATENT DOCUMENTS

DE      43 00 661          7/1994
WO      WO 2005/124569    * 12/2005

* cited by examiner

*Primary Examiner* — Frank Duong
(74) *Attorney, Agent, or Firm* — Ladas & Parry, LLP

(57) ABSTRACT

A communication module for connecting electrical host devices, each with an individual physical interface, to different external networks, where the communication module is connected to the host device via an interface and provides at least two physical interfaces, and where the communication module has a network connector which is adapted to the respective external network. In order to enable development of communication modules independently of the individual host device and to reuse them for many different host devices, provision is made for the host device to have a processor for identifying the communication module and for selecting the at least one physical interface which is suitable for the host device by means of serial communication.

13 Claims, 4 Drawing Sheets

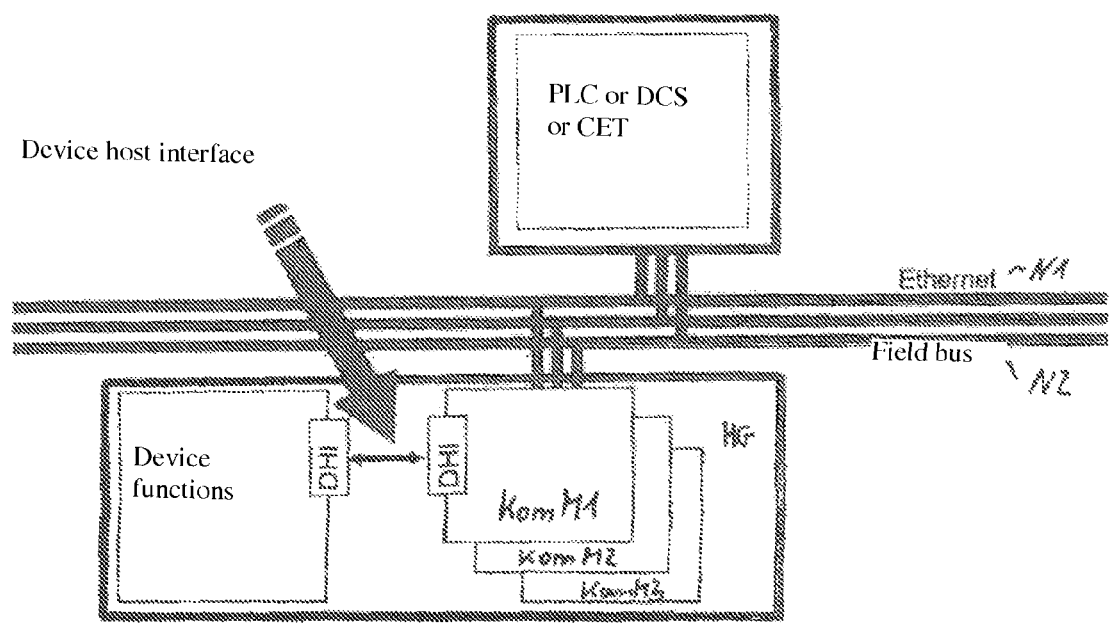

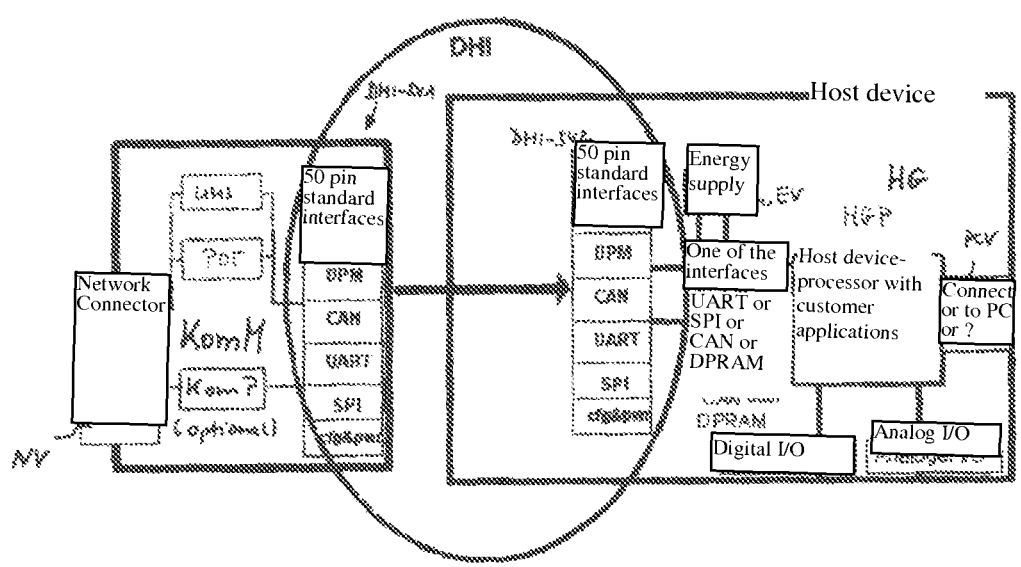

Figure 3: Physical view of the signals of a 50-pole compact flash plug

| # | CAN | | # | # | UART | | # | # | SPI | | # |
|---|---|---|---|---|---|---|---|---|---|---|---|
| 1 | PWR_GND | | 16 | 1 | PWR_GND | | 16 | 1 | PWR_GND | | 16 |
| 2 | Reserved_ID | | 17 | 2 | Reserved_ID | | 17 | 2 | Reserved_ID | | 17 |
| 3 | dat TX | CAN TX | 18 | 3 | dat TX | UART TX / dat TX | 18 | 3 | dat TX | dat RX | 18 |
| 4 | LED1 / LED5 | CAN RX | 19 | 4 | LED1 / LED5 | UART RX / dat RX | 19 | 4 | LED1 / LED5 | SCLK | 19 |
| 5 | LED2 / LED6 | dat RX | 20 | 5 | LED2 / LED6 | | 20 | 5 | LED2 / LED6 | MOSI | 20 |
| 6 | LED3 / LED7 | | 21 | 6 | LED3 / LED7 | | 21 | 6 | LED3 / LED7 | MISO | 21 |
| 7 | LED4 / LED8 | | 22 | 7 | LED4 / LED8 | | 22 | 7 | LED4 / LED8 | /SPI_SS | 22 |
| 8 | /Reset | | 23 | 8 | /Reset | Comm Mode: is TX enable / host, Tx enable, Trig. host->comm | 23 | 8 | /Reset | | 23 |
| 9 | | | 24 | 9 | Trig. comm -> host | | 24 | 9 | Trig. comm -> host | Trig. host-> comm | 24 |
| 10 | | | 25 | 10 | | | 25 | 10 | | | 25 |
| 11 | Sync | | 26 | 11 | Sync | POK | 26 | 11 | Sync | POK | 26 |
| 12 | PWR_GND | POK | 27 | 12 | PWR_GND | PWR_GND | 27 | 12 | PWR_GND | PWR_GND | 27 |
| 13 | PWR_VCC | PWR_GND | 28 | 13 | PWR_VCC | PWR_VCC | 28 | 13 | PWR_VCC | PWR_VCC | 28 |
| 14 | | PWR_VCC | 29 | 14 | | | 29 | 14 | | | 29 |
| 15 | | | 30 | 15 | | | 30 | 15 | | | 30 |

Figure 4: Physical view of the signals of a 30-pole plug:

COMMUNICATION MODULE AND METHOD FOR CONNECTING AN ELECTRICAL DEVICE TO A NETWORK

BACKGROUND OF THE INVENTION

The invention concerns a communication module for the connection of electric host-devices with respectively individual physical interface to different external networks, wherein the communication module is connected with the host device by means of an interface and provides at least two physical interfaces, of which a suitable one is selectable for the connection with the individual interface of the electric host device and wherein the communication module features a network connector that is adapted to the respective external network, as well as a method for the connection of electrical devices by means of a respectively individual physical interface by means of a communication module to different external networks, wherein the communication module is connected with the electric device by means of an interface and provides at least two physical interfaces, of which a suitable one is selected for the connection with the individual interface of the device and wherein the signals that are transmitted via the interface are adapted by means of the communication module to the respective external network.

DESCRIPTION OF RELATED ART

A communication module as well as a method of the type described above is described in WO-A-2005/124569, EP-A-177 9252 as well as EP-A-882800. The modularization and standardization of interfaces within a specific product family are part of prior art. This however takes into account only the demands of a specific product.

Based on these considerations it is the purpose of the invention at hand to further develop a communication module as well as a method of the type mentioned above in such a manner that the communication modules can be developed independently of individual host devices and can be utilized again for a plurality of different host devices.

The problem is solved according to the invention by means of a communication module in such a way that the host device features a processor for the identification of the communication module and for the selection of the at least one physical interface that is suitable for the host device by means of serial communication.

The problem is solved according to the method according to the invention in such a way that the host device identifies the communication module subject to the utilization of identification and recognition signals and selects at least one of the physical interfaces that are provided by the communication module.

The communication module as well as the method finds use in any device that has to be able to communicate by means of an external network.

This device is called "host device" and can be split into its main function and the communication function (module or option). Both parts are to be connected by means of the device host interface.

The host device has to of course make available only one of several partial interfaces, while the communication modules have to make available all, preferably four, interfaces. As a result the implementation of the interface within the host device can be optimized corresponding to the demands of the application (power versus cost) and the possibility still remains to select from a large selection of communication option modules that however all match the individual interface.

For host devices that require a connection to one or several communication networks the necessity no longer exists to again perform an implementation for each individual network, but to simply implement once the standardized host interface and to then select the required communication module from the list of available communication modules.

As a result the entire development effort can be reduced. Furthermore the properties per network can be harmonized across different products.

The specification of a standardized internal interface makes it possible to develop communication modules independently of individual host devices and to reuse them for many different host devices. The internal hardware architecture of the communication module is not relevant as long as the interface to the host device corresponds to the definition. The same stands for the host device, so long as the interface to the communication module corresponds to the definition.

Further details, advantages, and characteristics of the invention can be gathered not only from the claims, the characteristics that can be gathered from them—as such and/or in combination—but also from the preferred embodiment examples that can be gleaned from the drawing.

BRIEF DESCRIPTION OF THE SEVERAL VIEWS OF THE DRAWINGS

It is shown:

FIG. 1 the connection of a host device to different networks,

FIG. 2 a schematic representation of a communication module with interface to the host device, FIG. 3 a physical view of signals of a 50-pole compact flat plug and FIG. 4 a physical view of the signals of a 30-pole plug.

DETAILED DESCRIPTION OF THE INVENTION

FIG. 1 presents an electric host device HG that can be connected by means of communication module KomM1, KomM2, KomM3 to different external networks N1, N2 such as Ethernet or field bus.

The communication module KomM1 is connected by means of an interface DHI that can be labeled as device host interface with the host device in order to utilize its device functions and to make them available to the network N1, N2. Central controls such as PLC, DCS and/or CET can also be connected with the network N1, N2.

Figure 3:
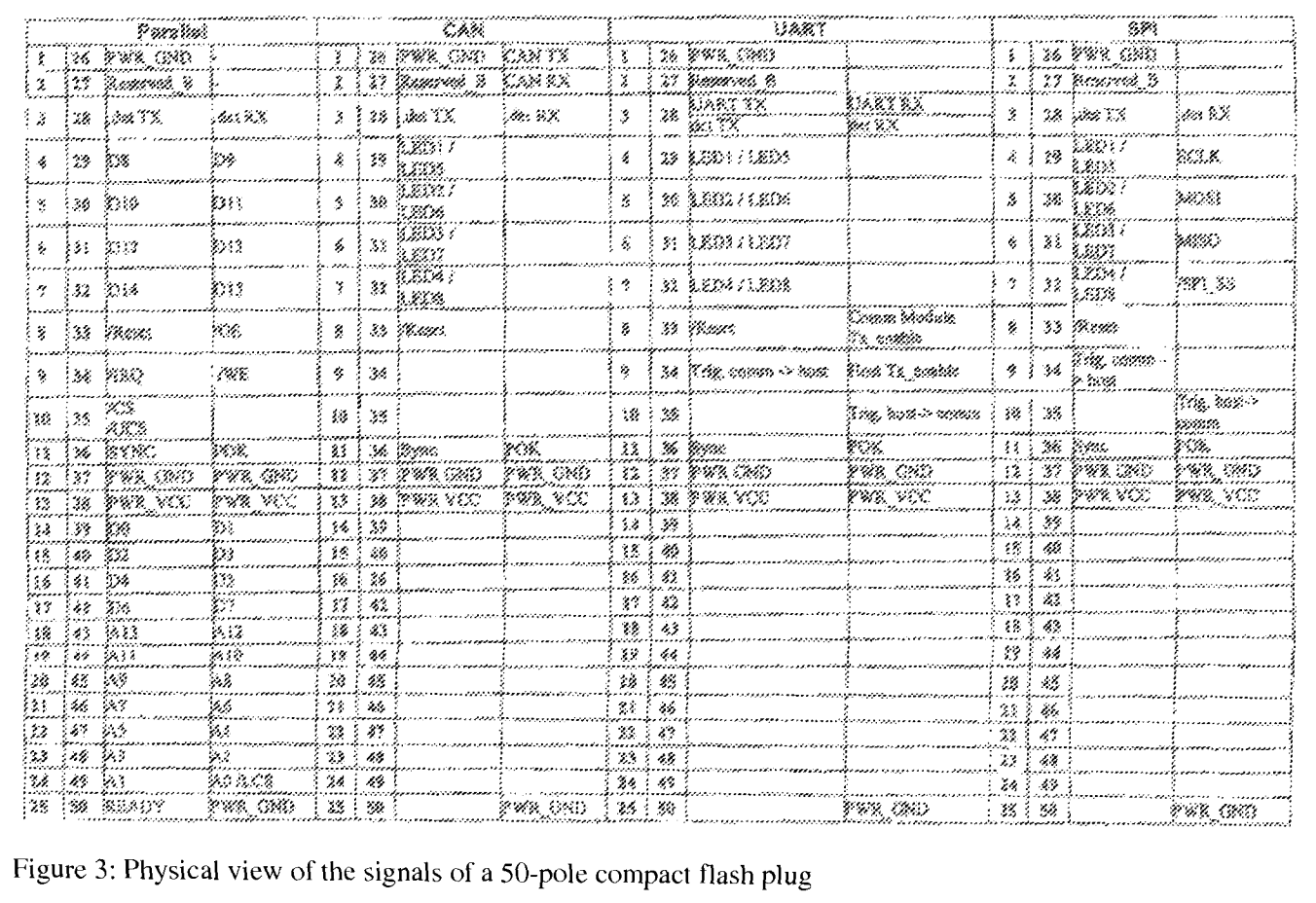

The host device interface DHI is comprised of several parts, as represented in FIGS. 1 and 2. This encompasses a plug connection DHI-SV1, DHI-SV2 that is preferably implemented as a 50 pin compact flash plug or a 30 pin plug. The plug assignment can be deduced from FIGS. 3 and 4. By means of the interface the module identification and basic hardware configuration takes place.

The signals themselves can be grouped as follows:
DPM, 16-bit data parallel-interface.
UART on the physical (bit-) level with additional handshake-signals and data flow control signals.
SPI on the physical (bit-) level with additional handshake-signals.
CAN on the physical level.
Recognition signals.
Voltage supply (PWR).

Some signals thereby share the same physical plug pin, which is only possible because these signals are not utilized at the same time. In particular the signals D8 to D15 of the parallel interface are utilized multiple times.

Furthermore the host device interface DHI encompasses mechanical elements such as enclosures, printed circuit boards that are not further represented.

This part assures the interchangeability of the different communication modules KomM1, KomM2, KomM3, meaning the utilization of a module for the network N1 in several different host devices HG.

Furthermore a protocol DHI is associated with the interface DHI in order to communicate via this interface. This protocol runs above the drivers for the physical (bit-) level.

In contrast to prior art the definition according to the invention of the interface or the module KomM provides not only two physical levels or interfaces but preferably four (16-bit parallel data, UART, SPI and CAN), of which each one can be selected by the host device HG.

In addition the definition according to the invention makes possible the simultaneous utilization of the parallel interface, the UART interface and the simple CAN interface.

In addition the definition of the plug DHI-SV1, DHI-SV2 facilitates the utilization of a 50-pole plug according to FIG. 3 as well as of a 30-pole plug according to FIG. 4 and namely in such a manner that both are interchangeable.

Furthermore the identification of the communication module KomM and the selection of the physical interface DPM, CAN, UART, SPI takes place with all required parameters not by means of static signals but by means of a serial communication.

The utilized communication modules KomM can be equipped with their own communication processor KomP, on which the interface protocol executes, as well as also be of a "dumb" type, and namely of such a kind that only means UMS for the conversion to another physical medium as well as means POT for the electrical isolation are available.

In the host device HG preferably only one of the preferably four physical interfaces DPM, CAN UART, SPI as well as an identification and detection interface is implemented, wherein either the 50-pole plug or the 30-pole plug is utilized.

The communication module KomM has to provide everything that is necessary in order to communicate via the external network N1, N2, for which it is intended. At the host device interface DHI all definitive physical partial interfaces DPM, CAN, UART, SPI or only one partial amount must be implemented.

A communication module KomM with a 30-pole plug can be utilized by a host device HG that features a 30-pole as well as also a 50-pole plug.

A communication module KomM with a 50-pole plug can only be utilized by a host device HG that features a 50-pole plug.

After the switching-on of the voltage EV the host device HG will identify the communication module KomM subject to the utilization of the identification and recognition signals. The communication module KomM will in the process transmit its signature that contains information about the implemented physical partial interfaces (to the host device) as well as the supported communication parameter and also provides information regarding whether this concerns an intelligent module (with DHI-P protocol) or a dumb module with medium-converted UMS and electrical isolation POT to the external network.

The host device HG then performs the base hardware configuration on the basis of the signature of the communication module. Subsequently the host device HG either switches to the High-Level-protocol DHI-P or takes over the control of the dumb module.

Intelligent communication modules KomM have to provide any means that are necessary in order to communicate over the external network N1, N2, but also a means such as micro-processor KomP in order to, by means of the High-LEVEL-protocol DHI-P, be able to exchange any type of information between the external network N1, N2 and the host device HG.

Dumb communication modules KomM have to make available the electrical isolation and the conversion into the medium of the external network N1, N2 as well as also all means that make it possible for the host device to read the signature of the communication module via the host interface. In addition means have to be provided that make it possible for the host device to control optical indicators such as LEDs on the communication module that are associated with the external network.

The device host interface DHI defines an interface between any host device HG and a modular option that makes access to any external network N1, N2 possible.

The interface DHI is preferably a device-internal interface. All signals are defined for the direct communication connection between processors, as a result no transceivers have to be utilized.

The interface DHI makes it possible that:
Host device HG and communication module KomM utilize a micro-processor KomP, HgP in order to execute a High-Level-protocol DHI-P for the purpose of data exchange. In this case the communication module KomM is called "intelligent module";
only the host device Hg features a microprocessor (HGP) without High-Level-protocol for the purpose of data exchange, however for controlling the communication module. In this case the communication module is called "dumb module".
The interface signals are defined for parallel and serial partial interfaces. Serial partial interfaces are UART, SPI and CAN.
The interface signals are defined for a 50-pole plug and—without physical parallel interface—also for a 30-pole plug in such a manner that that modules with a 30-pole plug and devices with a 50-pole plug are interoperable and the reverse,
Communication module KomM for the provision of all or individual partial interfaces.
Host devices HG that only provide one or several partial interfaces.
Identification of the communication module KomM by means of a simple serial interface (serial signature).
Base-hardware-configuration, meaning selection of the physical partial interface and transmission parameter, takes place by means of a simple serial interface.
After the base-hardware-configuration has taken place, the High-Level-protocol DHI-P is activated.

The invention claimed is:
1. Communication module (KomM) for the connection of electric host devices (HG) with respectively individual physical interface to an external network (N1, N2), wherein the communication module (KomM) is connectable with the host device (HG) by means of an interface (DHI) and by means of an adapted network connector (NV) with the respective external network (N1, N2), wherein the communication module (KomM) provides at least two physical interfaces, of which one is implemented as a serial interface, by means of which serial communication between the communication module

(KomM) and the host device (HG) is made possible and wherein the interface (DHI) features at least one electric connector by means of which at least two physical interfaces are selectable by means of the host device (HG), wherein the at least one electric connector (PIN3, PIN18; PIN3, PIN28) is a component of the serial interface (UART) of the communication module (KomM), wherein the communication module (KomM) features a signature that is readable by the host device (HG) by means of the serial interface and contains information regarding the physical interfaces that are implemented in the communication module (KomM) as well as communication parameters, and wherein the identification of the communication module (KomM) as well as the selection of the at least one physical interface that is suitable for the host device (HG) is executable by means of serial communication via the serial interface by means of the host device (HG).

2. Communication module according to claim 1, wherein the communication module (KomM) features a communication processor (KomP) via which, by means of an interface protocol (DHI-P), any type of information can be exchanged between the external network (N1, N2) and the host device (HG).

3. Communication module according to claim 1, wherein the communication module (KomM) features means for the electrical isolation and/or means for the conversion of signals to a medium of the external network (N1, N2).

4. Communication module according to claim 1, wherein the communication module (KomM) is implemented as an integral component of the host device (HG).

5. Communication module according to claim 1, wherein the interface (DHI) is implemented as a 50-pole or 30-pole plug-in connector (DHI-SV1, DHI-SV2).

6. Communication module according to claim 1, wherein the serial interface is implemented as UART, SPI, or CAN and/or the parallel interface as DPM.

7. Method for the connection of electric devices (DH) with respectively individual physical interface to an external network (N1, N2), by means of a communication module (KomM), wherein the communication module (KomM) is connectable with the electric device (DH) by means of an interface (DHI) and by means of an adapted network connector (NV) with the respective external network (N1, N2), wherein the communication module (KomM) provides at least two physical interfaces, of which one is implemented as a serial interface (UART), by means of which serial communication between the communication module (KomM) and the host device (HG) is made possible and the interface (DHI) features at least one electric connector by means of which at least two physical interfaces are selectable by means of the host device (HG), wherein the transmitted signals are adapted by the communication module (KomM) to the respective external network (N), wherein the at least one electric connector (PIN3, PIN18; PIN3, PIN28) is a component of the serial interface (UART) of the communication module (KomM), the method comprising the steps of: transmitting a signature by means of the communication module (KomM) and the serial interface (UART) to the host device (HG) that contains information regarding the physical interfaces that are implemented in the communication module (KomM) as well as communication parameters; and executing the identification of the communication module (KomM) as well as the selection of the at least one physical interface that is suitable for the host device (HG) by means of serial communication via the serial interface (UART) by means of the host device (HG).

8. Process according to claim 7, further comprising the step of implementing information to the signature transmitted from the communication module (KomM) to the host device (HG) regarding whether this concerns a communication module (KomM) that is an active communication module with an interface protocol (DHI-P) or a passive communication module with a medium converter and/or electrical isolation to the external network.

9. Process according to claim 7, further comprising the step of switching over the host device (HG), corresponding to the signature, switches over to the active interface protocol (DHI-P) or takes over the control of the passive communication module.

10. Method according to claim 8, further comprising the step of exchanging the data between the host device (HG) and the external network (N1, N2) via the interface protocol (DHI-P) that executes on the communication processor.

11. Process according to claim 8, further comprising the step of controlling the passive communication module (KomM) by the host device (HG), wherein a conversion of the transmitted signals to the physical medium of the external network (N1, N2) and/or an electrical isolation executes in the communication module (KomM).

12. Method according to claim 8, further comprising the step of defining the signals that are exchanged between the host device (HG) and the communication module (KomM) for the direct communication connection between processors.

13. Method according to claim 8, further comprising the step of transmitting the serial signals according to the UART-, SPI-, and CAN-standard.

* * * * *